(12) United States Patent
Shen et al.

(10) Patent No.: US 10,876,017 B2
(45) Date of Patent: Dec. 29, 2020

(54) COATINGS, METHODS AND COATED ARTICLES

(71) Applicant: SABIC Global Technologies B.V., Bergen op Zoom (NL)

(72) Inventors: Liang Shen, Shanghai (CN); Zhuxia Rong, Shanghai (CN); Mian Dai, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 89 days.

(21) Appl. No.: 16/302,290

(22) PCT Filed: May 19, 2017

(86) PCT No.: PCT/IB2017/052974
§ 371 (c)(1),
(2) Date: Nov. 16, 2018

(87) PCT Pub. No.: WO2017/199220
PCT Pub. Date: Nov. 23, 2017

(65) Prior Publication Data
US 2019/0194491 A1 Jun. 27, 2019

Related U.S. Application Data

(60) Provisional application No. 62/339,376, filed on May 20, 2016.

(51) Int. Cl.
*C09D 179/08* (2006.01)
*C08K 3/04* (2006.01)
(Continued)

(52) U.S. Cl.
CPC ....... *C09D 179/08* (2013.01); *C08G 73/1053* (2013.01); *C08G 73/1071* (2013.01);
(Continued)

(58) Field of Classification Search
CPC .............. C09D 179/08; C08G 73/1053; C08G 73/1071; C08K 3/04; C08K 3/22; C08K 2003/2227; C08L 27/12
(Continued)

(56) References Cited

FOREIGN PATENT DOCUMENTS

| EP | 0301543 A2 | 1/1989 |
|----|------------|--------|
| JP | 2012185393 A | 9/2012 |

(Continued)

OTHER PUBLICATIONS

JP 2012-185393 A, machine translation, EPO espacenet. (Year: 2012).*

(Continued)

*Primary Examiner* — Josephine L Chang
(74) *Attorney, Agent, or Firm* — Cantor Colburn LLP

(57) ABSTRACT

A coating layer includes a composite of a fluoropolymer and a high heat thermoplastic polyimide, the thermoplastic polyimide having 5 to 1000 units of the formula (I): wherein each V is the same or different, and is a substituted or unsubstituted tetravalent $C_{4-40}$ hydrocarbon group, and each R is the same or different, and is a substituted or unsubstituted $C_{2-20}$ divalent organic group A method of manufacturing a coating composite, coated substrates and articles are also described.

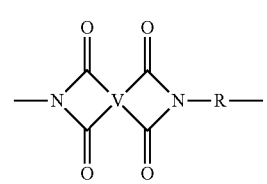

(I)

10 Claims, 1 Drawing Sheet

(51) Int. Cl.
*C08K 3/22* (2006.01)
*C08G 73/10* (2006.01)
*C08L 27/12* (2006.01)

(52) U.S. Cl.
CPC ............... *C08K 3/04* (2013.01); *C08K 3/22* (2013.01); *C08K 2003/2227* (2013.01); *C08L 27/12* (2013.01)

(58) Field of Classification Search
USPC .......................................................... 524/437
See application file for complete search history.

(56) References Cited

FOREIGN PATENT DOCUMENTS

WO          198403896 A1    10/1984
WO       2002053358 A2    7/2002

OTHER PUBLICATIONS

International Search Report; International Application No. PCT/IB2017/052974; International Filing Date: May 19, 2017; dated May 9, 2017; 4 pages.

Written Opinion; International Application No. PCT/IB2017/052974; International Filing Date: May 19, 2017; dated May 9, 2017; 6 pages.

* cited by examiner

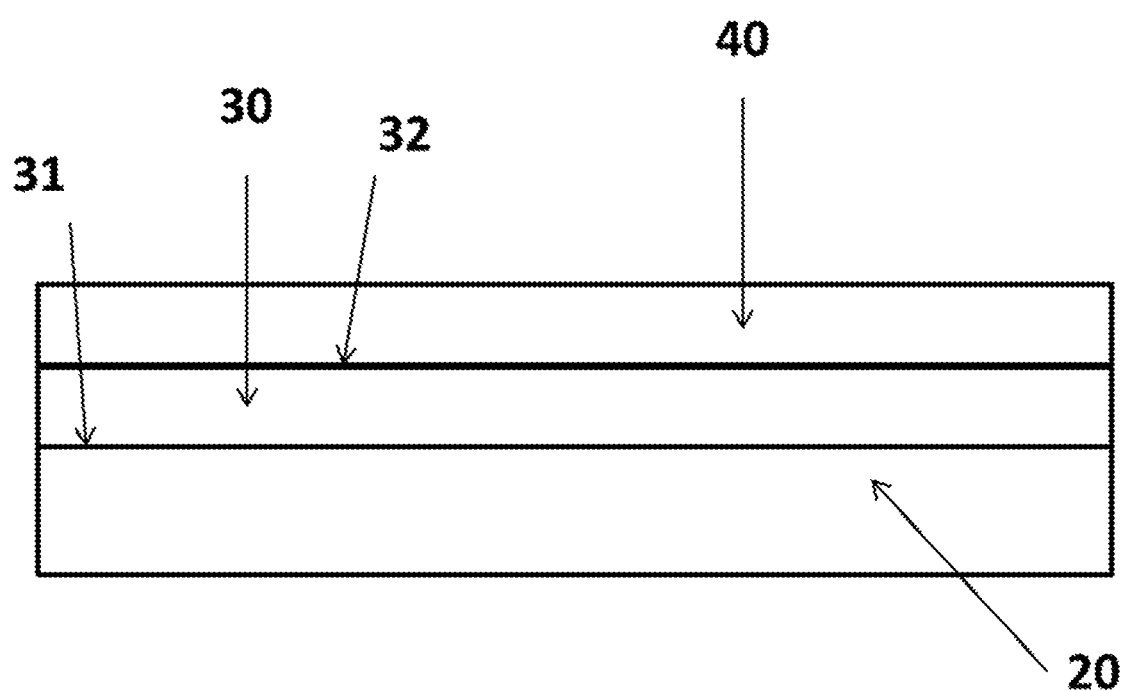

COATINGS, METHODS AND COATED ARTICLES

CROSS-REFERENCE TO RELATED APPLICATIONS

This application is a National Stage application of PCT/IB2017/052974, filed May 19, 2017, which claims the benefit of U.S. Provisional Application No. 62/339,376 filed May 20, 2016, both of which are incorporated by reference herein in their entirety.

BACKGROUND

The manufacture of cookware and other industrial articles typically involves forming multilayer bonded structures in which various materials are joined together to form the final article. For example, in the case of cookware, the corrosion resistance of stainless steel is ideal for the cooking surface as well as for the exterior surface; however, the thermal conductivity of stainless steel is not very high. Aluminum and/or copper offer much higher thermal conductivities and have been bonded to stainless steel to provide well-known composite cookware items such as pots, pans, and the like. The bonded aluminum and/or copper layers, while offering higher thermal conductivity for faster heating, can also result in hot spots on the cooking surface which can cause sticking of the food being cooked and more difficult clean-up of the stainless steel cooking surface. Non-stick surfaces such as poly(tetrafluoroethylene) (PTFE) coatings are also applied to the cook surface to counter the sticking problem. However, PTFE coatings can suffer from adhesion problems, particularly on metal and polar polymer surfaces.

Accordingly, there remains a continuing need in the art for improved coatings, particularly coatings with improved adhesion to metal and polymer surfaces.

SUMMARY

A coating layer comprises
a composite of a fluoropolymer and a high heat thermoplastic polyimide, the thermoplastic polyimide having 5 to 1000 units of the formula:

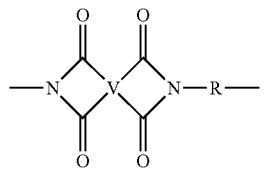

(1)

wherein each V is the same or different, and is a substituted or unsubstituted tetravalent $C_{4-40}$ hydrocarbon group, and
each R is the same or different, and is a substituted or unsubstituted $C_{2-20}$ divalent organic group.

A method of making a coating composite comprises mixing a high heat thermoplastic polyimide dispersion and a fluoropolymer, wherein the polyimide dispersion is in the form of a dry powder dispersion, an aqueous dispersion, or an organic dispersion, and producing the composite comprising the polyimide and the fluoropolymer.

A method of coating a substrate (20) comprises applying a coating layer comprising the composite of a polyimide and a fluoropolymer to at least a portion of the substrate (20) to form a first coating layer (30) having a first side (31) in contact with the substrate and a second side (32) opposite the first side, and applying a fluoropolymer layer over at least a portion of the second side (32) of the first coating layer to provide a second coating layer (40).

A metal or polymer substrate comprises a coating made by the method described above.

Also described are articles comprising the coated substrates.

The above-described and other features are exemplified by the following figures and detailed description.

BRIEF DESCRIPTION OF THE DRAWINGS

The following FIGURE is an exemplary embodiment wherein the like elements are numbered alike.

FIG. 1 shows a cross sectional view of a multilayer coating in accordance with an embodiment of the present disclosure.

DETAILED DESCRIPTION

The present inventors have discovered that traditional PTFE coatings can have limited adhesion when applied to metal and polymer substrates. It was unexpectedly found that a coating comprising a composite of a polyimide such as a polyetherimide with a fluoropolymer has improved adhesion over the fluoropolymer alone. The polyimide/fluoropolymer composite can provide a primer layer on the substrate for application of further layers such as fluoropolymer layers. A polyimide/fluoropolymer composite coating has wide application in cookware and other applications.

In an embodiment, a coating layer comprises a composite of a fluoropolymer and a high heat thermoplastic polyimide. The coating layer can have a thickness of 2 to 50 μm, for example.

In an embodiment, the polyimide/fluoropolymer coating composite comprises 10 to 80 wt % of the polyimide, preferably 25 to 75 wt % of the polyimide, based upon the total weight of the coating layer.

In an embodiment, the polyimide in the polyimide/fluoropolymer coating has an average particle diameter of 1 to 25 μm, preferably 1 to 10 μm in the coating composite.

In an embodiment, the polyimide/fluoropolymer coating has improved adhesion to a metal and/or a polar polymer surface compared to a neat fluoropolymer coating applied to the same substrate. Adhesion can be measured using the cross cut tap test according to ASTM D3359, the peeling testing according to ASTM D1876, or a combination thereof. Improved adhesion comprises a 10% or greater improvement in adhesion based upon one or both of the foregoing tests.

Polyimides comprise more than 1, for example 3 to 1000, or 5 to 500, or 10 to 100, structural units of formula (1)

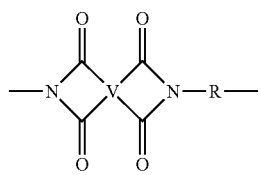

(1)

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas

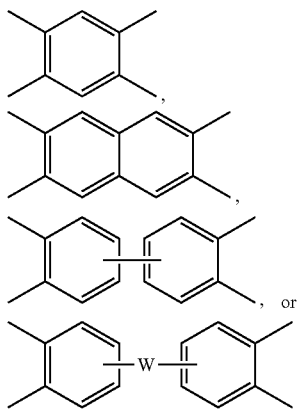

wherein W is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or a group of the formula T as described in formula (3) below.

Each R in formula (1) is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formulas (2)

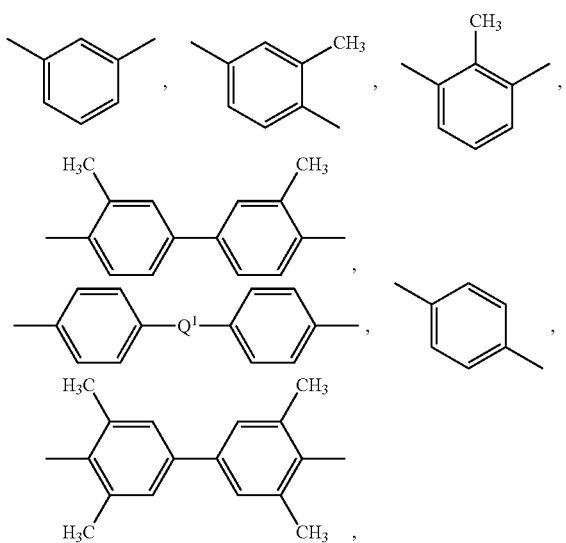

(2)

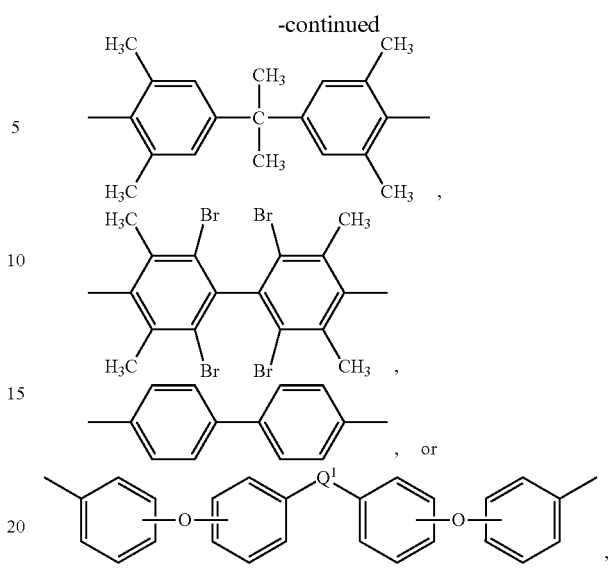

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diaryl sulfone.

Polyetherimides are a class of polyimides that comprise more than 1, for example 3 to 1000, or 5 to 500, or 10 to 100 structural units of formula (3)

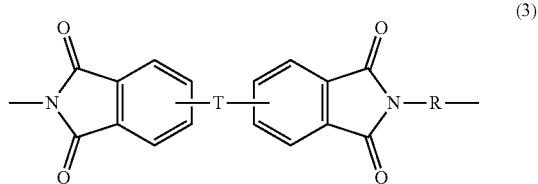

(3)

wherein each R is the same or different, and is as described in formula (1).

Further in formula (3), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups derived from a dihydroxy compound of formula (4)

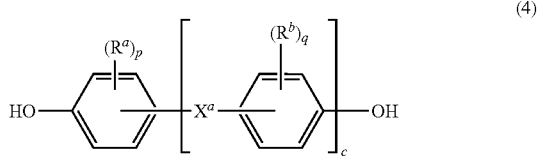

(4)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorus. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

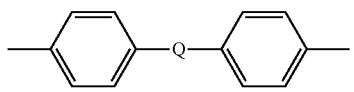

(4a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (3), R is m-phenylene or p-phenylene and T is —O—Z—O— wherein Z is a divalent group of formula (4a). Alternatively, R is m-phenylene or p-phenylene and T is —O—Z—O wherein Z is a divalent group of formula (4a) and Q is 2,2-isopropylidene.

In some embodiments, the polyetherimide can be a copolymer, for example, a polyetherimide sulfone copolymer comprising structural units of formula (1) wherein at least 50 mole % of the R groups are of formula (2) wherein $Q^1$ is —SO$_2$— and the remaining R groups are independently p-phenylene or m-phenylene or a combination comprising at least one of the foregoing; and Z is 2,2'-(4-phenylene) isopropylidene.

Alternatively, the polyetherimide copolymer optionally comprises additional structural imide units, for example imide units of formula (1) wherein R and V are as described in formula (1), for example V is

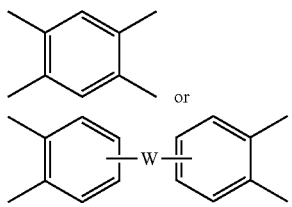

or wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide. The polyimide and polyetherimide can be prepared by any of the methods well known to those skilled in the art, including the reaction of an aromatic bis(ether anhydride) of formula (5a) or formula (5b)

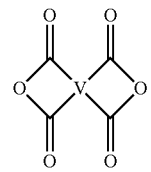

(5a)

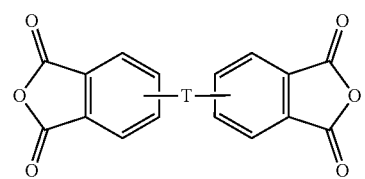

(5b)

or a chemical equivalent thereof, with an organic diamine of formula (6)

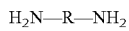

$H_2N—R—NH_2$ (6)

wherein V, T, and R are defined as described above. Copolymers of the polyetherimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include hexamethylenediamine, polymethylated 1,6-n-hexanediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis (p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. Combinations of these compounds can also be used. In some embodiments the organic diamine is m-phenylenediamine, p-phenylenediamine, 4,4'-diaminodiphenyl sulfone, or a combination comprising at least one of the foregoing.

The polyimides and polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimide polymers typically have an intrinsic viscosity greater than 0.2 deciliters per gram (dl/g), or, more specifically, 0.35 to 0.7 dl/g as measured in m-cresol at 25° C.

"Fluoropolymers" as used herein include homopolymers and copolymers that comprise repeat units derived from a fluorinated alpha-olefin monomer, i.e., an alpha-olefin monomer that includes at least one fluorine atom substituent, and optionally, a non-fluorinated, ethylenically unsaturated monomer reactive with the fluorinated alpha-olefin monomer. Exemplary alpha-olefin monomers include $CF_2=CF_2$, $CHF=CF_2$, $CH_2=CF_2$, $CH=CHF$, $CClF=CF_2$, $CCl_2=CF_2$, $CClF=CClF$, $CHF=CCl_2$, $CH_2=CClF$, and $CCl_2=CClF$, $CF_3CF=CF_2$, $CF_3CF=CHF$, $CF_3CH=CF_2$, $CF_3CH=CH_2$, $CF_3CF=CHF$, $CHF_2CH=CHF$, and $CF_3CH=CH_2$, and perfluoro($C_{2-8}$)alkylvinylethers such as perfluoromethyl vinyl ether, perfluoropropyl vinyl ether, and perfluorooctylvinyl ether. In some embodiments the fluorinated alpha-olefin monomer is tetrafluoroethylene ($CF_2=CF_2$), chlorotrifluoroethylene ($CClF=CF_2$), (perfluorobutyl)ethylene, vinylidene fluoride ($CH_2=CF_2$) and hexafluoropropylene ($CF_2=CFCF_3$). Exemplary non-fluorinated monoethylenically unsaturated monomers include ethylene, propylene, and butene, and ethylenically unsaturated aromatic monomers such as styrene and alpha-methylstyrene.

Exemplary fluoropolymers include poly(chlorotrifluoroethylene) (PCTFE), poly(chlorotrifluoroethylene-ethylene), poly(ethylene-tetrafluoroethylene) (ETFE), poly(ethylene-chlorotrifluoroethylene) (ECTFE), poly(hexafluoroethylene), poly(tetrafluoroethylene) (PTFE), poly(tetrafluoroethylene-ethylene-propylene), poly(tetrafluoroethylene-hexafluoroethylene) (also known as fluorinated ethylene-propylene copolymer (FEP)), poly(tetrafluoroethylene-propylene) (also known as fluoroelastomer (FEPM), poly(tetrafluoroethylene-perfluoropropylene vinyl ether), a copolymer having a tetrafluoroethylene backbone with a fully fluorinated alkoxy side chain (also known as a perfluoroalkoxy polymer (PFA)), for example poly(tetrafluoroethylene-perfluoropropylene vinyl ether), polyvinylfluoride (PVF), polyvinylidene fluoride (PVDF), poly(vinylidene fluoride-chlorotrifluoroethylene), perfluoropolyether, perfluoropolyoxetane, or a combination comprising at least one of the foregoing. In some embodiments the fluoropolymer is FEP, poly(tetrafluoroethylene-ethylene-propylene), PFA, ETFE, or PTFE, which can be fibril forming or non-fibril forming. A combination comprising at least one of the foregoing can be used. FEP is available under the trade TEFLON® FEP from DuPont or NEOFLON™ FEP from Daikon; and PFA is available under the trade name NEOFLON™ PFA from Daikin, TEFLON® FEP from DuPont, or HYFLON® PFA from Solvay Solexis.

The coating composite can further optionally include one or more additives that are generally known in the art to be useful for polymeric coating compositions, with the proviso that the one or more additives do not significantly adversely affect one or more of the desired properties of the composition. For example, the additive(s) can include a functional filler, an impact modifier, flow modifier, filler, reinforcing agent, antioxidant, heat stabilizer, light stabilizer, ultraviolet (UV) light stabilizer, UV absorbing additive, plasticizer, lubricant, release agent, antistatic agent, anti-fog agent, antimicrobial agent, colorant (e.g., a dye or pigment), surface effect additive, radiation stabilizer, flame retardant, anti-drip agent, or a combination comprising one or more of the foregoing. The additive(s) can generally be included in any amount that is known to be effective, for example 0 to 20 weight percent, for example 0.1 to 10 weight percent based on the total weight of the polymer components (e.g., the polyimide, fluoropolymer, or combination thereof).

In an embodiment, a coating layer is in the form of a multilayer coating further comprising a second layer comprising a fluoropolymer as described above, such as PTFE, poly(tetrafluoroethylene-ethylene-propylene), FEP, PFA, ETFE, or a combination comprising at least one of the foregoing. The second coating layer is applied on at least a portion of the first coating layer comprising the polyimide/fluoropolymer composite. The polyimide/fluoropolymer composite layer is applied directly to the substrate and thus can act as a primer layer to improve adhesion of a fluoropolymer layer. In an embodiment, the second layer consists essentially of, or consists of, a fluoropolymer and an additive.

FIG. 1 shows an embodiment of a substrate (20) comprising a multilayer coating. A polyimide/fluoropolymer coating layer (30), having a first side (31) opposite a second side (32) is disposed on at least a portion of the substrate (20). In a preferred embodiment, the first coating layer (30) completely covers at least one surface of the substrate, or the entire substrate. A second coating layer (40) comprising a fluoropolymer is disposed on at least a portion of the second side (32) of the first layer. In one embodiment, the second layer (40) completely covers the first layer (30).

A method of making a coating composite comprises combining a high heat thermoplastic polyimide dispersion, a fluoropolymer, and any optional additives, wherein the polyimide dispersion is in the form of a dry powder dispersion, an aqueous dispersion, or an organic dispersion, to produce the composite comprising the polyimide and the fluoropolymer. In an embodiment, the fluoropolymer is also in the form of a dispersion when added to the polyimide dispersion, such as a dry powder dispersion, an aqueous dispersion, or an organic dispersion.

In an embodiment, the polyimide is in the form of a dispersion in a solvent when combined with the fluoropolymer. The solvent can be water, an organic solvent, or a combination thereof, but is preferably water. Optional additives such as lubricants can be added before, during, or after the polyimide dispersion is mixed with the fluoropolymer. Exemplary solvents for the polyimide dispersion include water, methylene chloride, 1,2-dichloroethane, chlorobenzene, toluene, n-methylpyrrolidone (NMP), dimethylsulfoxide (DMSO), dimethylformamide (DMF), or a combination comprising at least one of the foregoing solvents. The same or different solvents can be used for the fluoropolymer dispersion.

Optionally, the polyimide dispersion is milled prior to mixing it with the fluoropolymer. Prior to milling, the polyimide can have a particle size diameter of 1 to 500 μm, preferably 1 to 50 μm, and more preferably 1 to 20 μm. Exemplary milling methods include ball milling, mechanical milling, fluidized bed milling, high speed dispersion, and other milling methods that are known in the art. The milling produces polyimide particles having an average particle diameter of 1 to 50 μm, preferably 1 to 20 μm. In an embodiment, milling is performed for 0.5 to 120 minutes using a ball mill or high speed dispersion machine.

In an embodiment, the milling of the polyimide dispersion is performed in the presence of a functional filler such as $Al_2O_3$ or carbon black. When present, the functional filler is used in an amount of 0.1 to 10 wt %, based upon the weight of the coating composite. The functional filler can be encapsulated by the polyimide during milling which can advantageously provide improved steam and corrosion resistance.

The polyimide/fluoropolymer composite can then be used to coat a substrate such as a metal or polymer substrate. Exemplary coating methods include roller coating, screen printing, spreading, spray coating, spin coating, dip coating, and the like, or a combination comprising at least one of the foregoing techniques. In one embodiment, the polyimide/fluoropolymer composite is a primer coating for a subsequently applied fluoropolymer coating.

The substrate for coating can be any material, for example, a metal or polymer substrate. Exemplary substrates include steel, stainless steel, aluminum, copper, titanium, and polar polymers such as polycarbonate, polymethylmethacrylate, polystyrene, high impact polystyrene, polyphenylene oxide, and acrylonitrile-butadiene-styrene.

In an embodiment, a method of coating a substrate (20) comprises applying the polyimide/fluoropolymer composite coating layer as described herein to at least a portion of the substrate to form a first coating layer (30) having a first side (31) in contact with the substrate (20) and a second side (32) opposite the first side and applying a fluoropolymer layer over at least a portion of the second side (32) of the first coating layer to provide a second coating layer. The method can further comprise applying additional layers such as a third layer over at least a portion of the second layer. The third layer can also comprise a fluoropolymer as described above. In an embodiment, the polyimide/fluoropolymer composite forms a primer coating on the substrate for the second coating layer.

In an embodiment, the method further comprises drying the first coating layer prior to applying the second coating layer, drying the second layer after application to the first coating layer, optionally curing the coating layers on the substrate, or a combination thereof. A typical curing condition is 380 to 400° C. for 15 to 20 minutes.

In an embodiment, the second coating layer exhibits improved adhesion to the substrate compared to a neat fluoropolymer layer of the same composition applied directly to the substrate, wherein improved adhesion is a 10% or greater improvement in the cross cut tap test according to ASTM D3359, the peeling testing according to ASTM D1876, or a combination thereof.

In an embodiment, a metal or polymer substrate comprises the polyimide/fluoropolymer coating composite described herein.

Also included herein are articles comprising substrates coated with the polyimide/fluoropolymer composites as a first or primer layer and a fluoropolymer as a second layer. Exemplary articles include cookware, an industrial part, a building and construction part, a medical device, an electrical and engineering part, an aerospace part, or an automotive part, and the like.

Cookware includes rice cookers, fry pans, sauté pans, chef's pans, omelet pans, griddle plates, grills, pots such as stock pots, and the like. Industrial parts include polymer molds, food processing equipment, chemical impellers, mixing tanks, engineered parts, ball bearings, gears, slide plates, industrial dies, metal-forming tools, saw blades, heaters, pre-heaters, lock parts, pump parts, fasteners such as screws, paint gun part, and others. The coatings can help provide impact resistance, for example. Building and construction parts include exhaust ducts and electrical insulators. The coatings can be used in applications requiring durability, weather resistance, and ultraviolet and ozone resistance. Electrical and electronics applications include insulation, fittings, connectors, cable guides, and portable electrical equipment. The coatings can provide chemical resistance and insulating properties. Automotive applications include coatings for fuel and hydraulic lines, fuel injectors, fuel filters, carburetors, and the like.

The invention is further illustrated by the following Embodiments, which are not intended to limit the claims.

Embodiment 1

A coating layer, comprising a composite of a fluoropolymer and a thermoplastic polyimide, the thermoplastic polyimide having 5 to 1000 units of the formula:

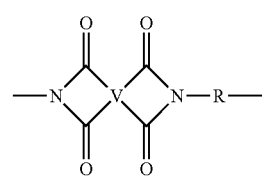

(1)

wherein each V is the same or different, and is a substituted or unsubstituted tetravalent $C_{4-40}$ hydrocarbon group, and each R is the same or different, and is a substituted or unsubstituted $C_{2-20}$ divalent organic group.

Embodiment 2

The coating layer of Embodiment 1, wherein the thermoplastic polyimide is a polyetherimide having units of the formula

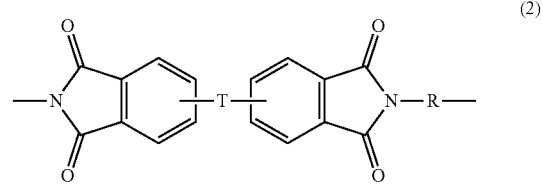

(2)

wherein R is as defined in Embodiment 1, T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded.

Embodiment 3

The coating layer of Embodiment 2, wherein R is a group of the formula

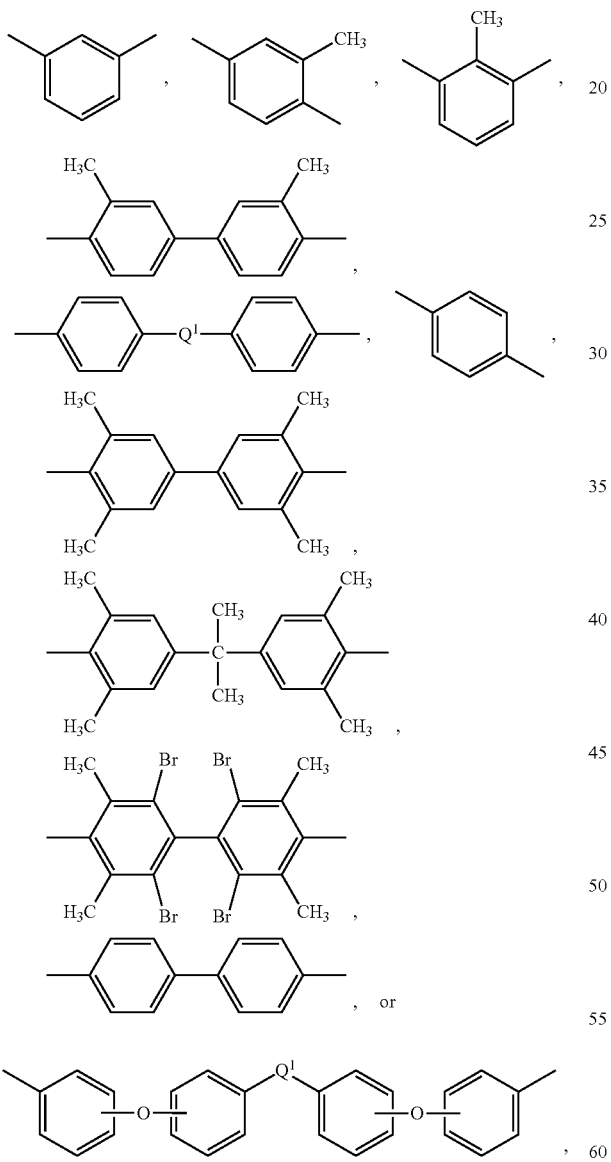

wherein $Q^1$ is —O—, —S—, —C(O)—, —SO$_2$—, —SO—, —C$_y$H$_{2y}$— or a halogenated derivative thereof, wherein y is an integer from 1 to 5, or —(C$_6$H$_{10}$)$_z$—, wherein z is an integer from 1 to 4; and Z is a group derived from a dihydroxy compound of the formula

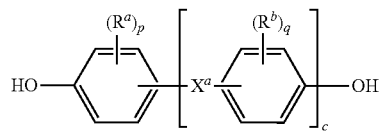

wherein $R_a$ and $R_b$ are each independently a halogen atom or a monovalent $C_{1-6}$ alkyl group; p and q are each independently integers of 0 to 4; c is 0 to 4; and $X_a$ is a single bond, —O—, —S—, —S(O)—, —SO$_2$—, —C(O)—, or a $C_{1-18}$ organic bridging group.

Embodiment 4

The coating layer of Embodiment 3, wherein each R is independently meta-phenylene or para-phenylene, and Z is 4,4'-diphenylene isopropylidene.

Embodiment 5

The coating layer of any one or more of Embodiments 1 to 4, wherein the fluoropolymer is poly(tetrafluoroethylene), poly(tetrafluoroethylene-ethylene-propylene), poly(tetrafluoroethylene-hexafluoroethylene), a perfluoroalkoxy polymer, poly(ethylene-tetrafluoroethylene), or a combination comprising at least one of the foregoing.

Embodiment 6

The coating layer of any one or more of Embodiments 1 to 5, wherein the polyimide comprises 10 to 80 wt % of the total weight of the coating layer.

Embodiment 7

The coating layer of any one or more of Embodiments 1 to 6, having a thickness of 2 to 50 μm.

Embodiment 8

The coating layer of any one or more of Embodiments 1 to 7, wherein the polyimide has a particle size diameter of 1 to 25 μm, preferably 1 to 10 μm.

Embodiment 9

The coating layer of any one or more of Embodiments 1 to 8, further comprising a functional filler, preferably Al$_2$O$_3$ or carbon black.

Embodiment 10

The coating layer of any one or more of Embodiments 1 to 9, in the form of a multilayer coating further comprising a second layer comprising a fluoropolymer disposed on at least a portion on of the layer comprising the composite of the fluoropolymer and the high heat thermoplastic polyimide.

Embodiment 11

A method of making a coating composite, comprising combining a high heat thermoplastic polyimide dispersion and a fluoropolymer, wherein the polyimide dispersion is in the form of a dry powder dispersion, an aqueous dispersion, or an organic dispersion, and producing the composite comprising the polyimide and the fluoropolymer.

Embodiment 12

The method of Embodiment 11, further comprising milling the high heat thermoplastic polyimide dispersion prior to mixing with the fluoropolymer.

Embodiment 13

The method of Embodiment 12, wherein, prior to milling, the polyimide has a particle size diameter of 1 to 500 μm, preferably 1 to 50 μm, or more preferably 1 to 20 μm.

Embodiment 14

The method of Embodiment 13, wherein milling is performed in the presence of a functional filler, preferably $Al_2O_3$ or carbon black.

Embodiment 15

The method of any one or more of Embodiments 11 to 14, wherein milling is performed for 0.5 to 12 hours using a high speed dispersion machine or a ball grinder.

Embodiment 16

The method of any one or more of Embodiments 11 to 15, wherein the polyimide has a particle size diameter of 1 μm to 50 μm, preferably 1 μm to 20 μm after milling.

Embodiment 17

A method of coating a substrate, preferably a metal or polymer substrate, the method comprising applying the coating layer of any one or more of Embodiments 1 to 9 to at least a portion of a surface of the substrate to form a first coating layer (30) having a first side (31) in contact with the substrate (20) and a second side (32) opposite the first side, and applying a fluoropolymer layer over at least a portion of the second side (32) of the first coating layer to provide a second coating layer (40); optionally further comprising drying the first coating layer prior to applying the second coating layer, drying the second layer after application to the first coating layer; and optionally curing the coating layers on the substrate.

Embodiment 18

The method of Embodiment 17, wherein the second coating layer exhibits improved adhesion to the substrate compared to a neat fluoropolymer layer of the same composition applied directly to the substrate, wherein improved adhesion is a 10% or greater improvement in the cross cut tap test according to ASTM D3359, the peeling testing according to ASTM D1876, or a combination thereof.

Embodiment 19

A substrate, preferably a metal or polymer substrate, comprising the coating layer of any one or more of Embodiments 1 10, the coating layer made by the method of any one or more of Embodiments 11 to 16, or a coating made by the method of any one or more of Embodiments 17 to 18.

Embodiment 20

An article comprising the substrate of Embodiment 19, preferably wherein the article is cookware, an industrial part, a medical device, a building or construction part, an electrical or electronics part, an aerospace part, or an automotive part.

The compositions, methods, and devices can alternatively comprise, consist of, or consist essentially of, any appropriate components or steps herein disclosed. The compositions, methods, and devices can additionally, or alternatively, be manufactured so as to be devoid, or substantially free, of any steps, components, materials, ingredients, adjuvants, or species that are otherwise not necessary to the achievement of the function or objectives of the assemblies, methods, and devices.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and can be present in other embodiments. In addition, it is to be understood that the described elements can be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. Unless indicated otherwise, "substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—$S(=O)_2$-alkyl), a $C_{6-12}$ aryl sulfonyl (—$S(=O)_2$-aryl)a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A coating layer, comprising
a composite of a fluoropolymer and a thermoplastic polyimide, the thermoplastic polyimide having 5 to 1000 units of the formula:

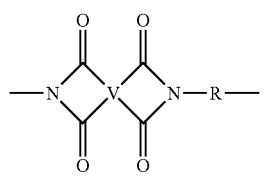

(1)

wherein
each V is the same or different, and is a substituted or unsubstituted tetravalent $C_{4-40}$ hydrocarbon group, and
each R is the same or different, and is a substituted or unsubstituted $C_{2-20}$ divalent organic group;
wherein the coating layer has a thickness of 2 to 50 μm;
wherein the thermoplastic polyimide has a particle size diameter of 1 to 25 μm; and
wherein the coating layer is in the form of a multilayer coating further comprising a second layer comprising a fluoropolymer disposed on at least a portion on of the layer comprising the composite of the fluoropolymer and the thermoplastic polyimide.

2. The coating layer of claim 1, wherein the thermoplastic polyimide is a polyetherimide having units of the formula

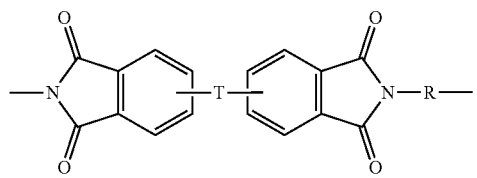

(2)

wherein R is as defined in claim 1,
T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded.

3. The coating layer of claim 2, wherein R is a group of the formula

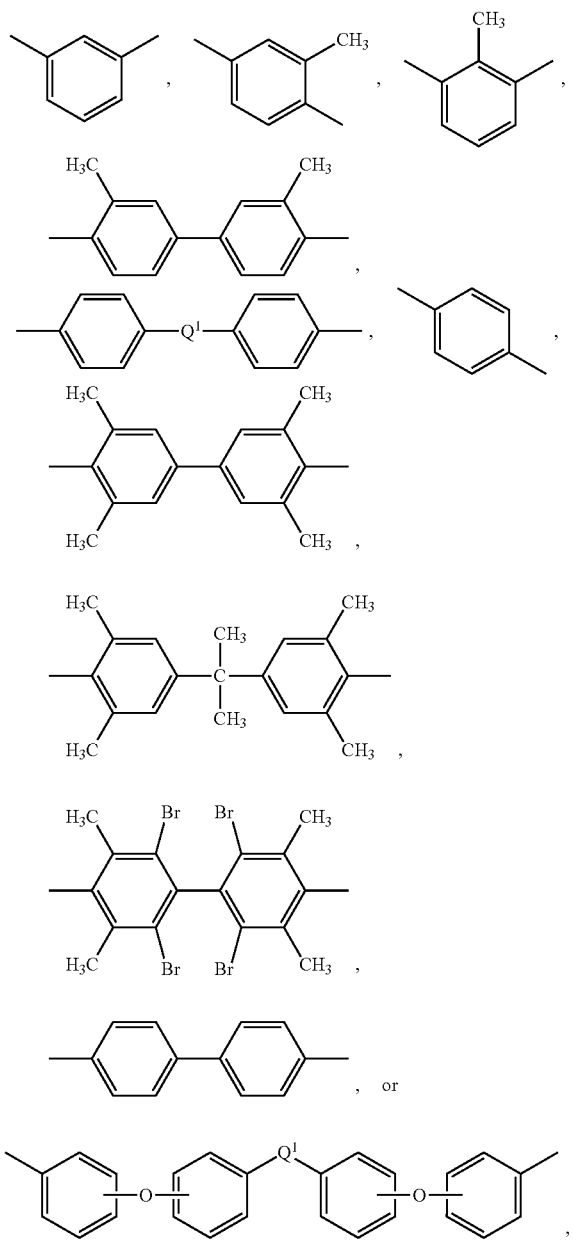

wherein $Q^1$ is —O—, —S—, —C(O)—, —$SO_2$—, —SO—, —$C_yH_{2y}$— or a halogenated derivative thereof, wherein y is an integer from 1 to 5, or —$(C_6H_{10})_z$—, wherein z is an integer from 1 to 4; and Z is a group derived from a dihydroxy compound of the formula

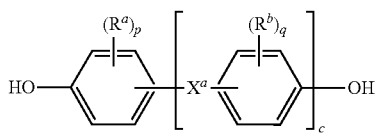

wherein
 Ra and Rb are each independently a halogen atom or a monovalent $C_{1-6}$ alkyl group;
 p and q are each independently integers of 0 to 4;
 c is 0 to 4; and
 $X_a$ is a single bond, —O—, —S—, —S(O)—, —SO$_2$—, —C(O)—, or a $C_{1-18}$ organic bridging group.

4. The coating layer of claim 3, wherein each R is independently meta-phenylene or para-phenylene, and Z is 4,4'-diphenylene isopropylidene.

5. The coating layer of claim 1, wherein the fluoropolymer is poly(tetrafluoroethylene), poly(tetrafluoroethylene-ethylene-propylene), poly(tetrafluoroethylene-hexafluoroethylene), a perfluoroalkoxy polymer, poly(ethylene-tetrafluoroethylene), or a combination comprising at least one of the foregoing.

6. The coating layer of claim 1, wherein the thermoplastic polyimide comprises 10 to 80 wt % of the total weight of the coating layer.

7. The coating layer of claim 1, further comprising a functional filler.

8. A method of coating a substrate, the method comprising
 applying the coating layer of claim 1 to at least a portion of a surface of the substrate to form a first coating layer (30) having a first side (31) in contact with the substrate (20) and a second side (32) opposite the first side, and
 applying a fluoropolymer layer over at least a portion of the second side (32) of the first coating layer to provide a second coating layer (40);
 optionally further comprising drying the first coating layer prior to applying the second coating layer, drying the second layer after application to the first coating layer; and
 optionally curing the coating layers on the substrate.

9. A substrate, comprising the coating layer of claim 1.

10. An article comprising the substrate of claim 9.

* * * * *